ELECTRICAL SYNCHRONIZING SYSTEM

Filed Nov. 8, 1947

INVENTOR.
Frederick A. Lindley
and Frederick M. Arbuckle
BY
Chester A. Braselton
Attorney Patented Mar. 24, 1953 2,632,853

UNITED STATES PATENT OFFICE 2,632,853

ELECTRICAL SYNCHRONIZING SYSTEM

Frederick A. Lindley, Flushing, N. Y., and Frederick M. Arbuckle, Allenhurst, N. J., assignors to Radio-Television Institute, Inc., New York, N. Y., a corporation of New York Application November 8, 1947, Serial No. 784,915

14 Claims. (Cl. 250—36)

This invention relates to improvements in synchronizing systems, and more particularly it relates to improved electrical means for the synchronization of television scanning circuits.

Present day television methods employ the R. M. A. type of video signal, which video signal consists of the video portion, which comprises the picture information and synchronizing pulses which are in supports between the picture information at regular and predetermined intervals, and effect synchronization of the received scanning means with the transmitting scanning means. The synchronizing means of the video signal consists of synchronizing pulses, the horizontal synchronizing pulses which occur at the beginning of every scanning line, and the vertical pulse, which occurs at the beginning of every vertical scanning. In television receivers these synchronizing pulses are separated from the rest of the video signal and are in turn separated from each other by differentiating and integrating means, and are applied to circuits effecting the synchronization of the horizontal and vertical scanning circuits. In the normal reception of television signals noise and sputter responses occur and effect distortions of the synchronizing pulses, even cancelling out synchronizing pulses. The effect of this and other interference is to reduce the accuracy of the scanning circuits and thereby degrade the appearance of the received television picture.

It is an object of this invention to disclose a means of synchronization which, in itself, reduces the need for a perfectly noise-free synchronizing pulse.

It is also a purpose of this invention to describe a method of scanning synchronization which is simple and economical of construction, and having the advantage that it produces a scanning wave form which is substantially in the correct timing relation to a synchronizing pulse should it not be properly received due to interference or other causes, and consequently preserves to a visibly satisfactory degree the overall picture structure received during the absence of a synchronizing pulse, thus eliminating the well known tearing out of the horizontal line structure due to noise interference.

It is also a purpose of this invention to describe a synchronizing means which may be advantageously applied to the sweep circuits of television receivers deriving their high voltage supply by impulse step-up and rectification from the deflection circuits so that the magnitude of the high voltage so obtained, which is dependent upon the proper timing of the sawtooth generating device in the sweep circuit, is substantially constant and independent in magnitude of the received synchronizing impulse.

Other objects and advantages will hereinafter appear in the following disclosure and embodiments shown in the description and drawings, wherein.

Figures 1, 2, 3, 4, 5, 6, 7:
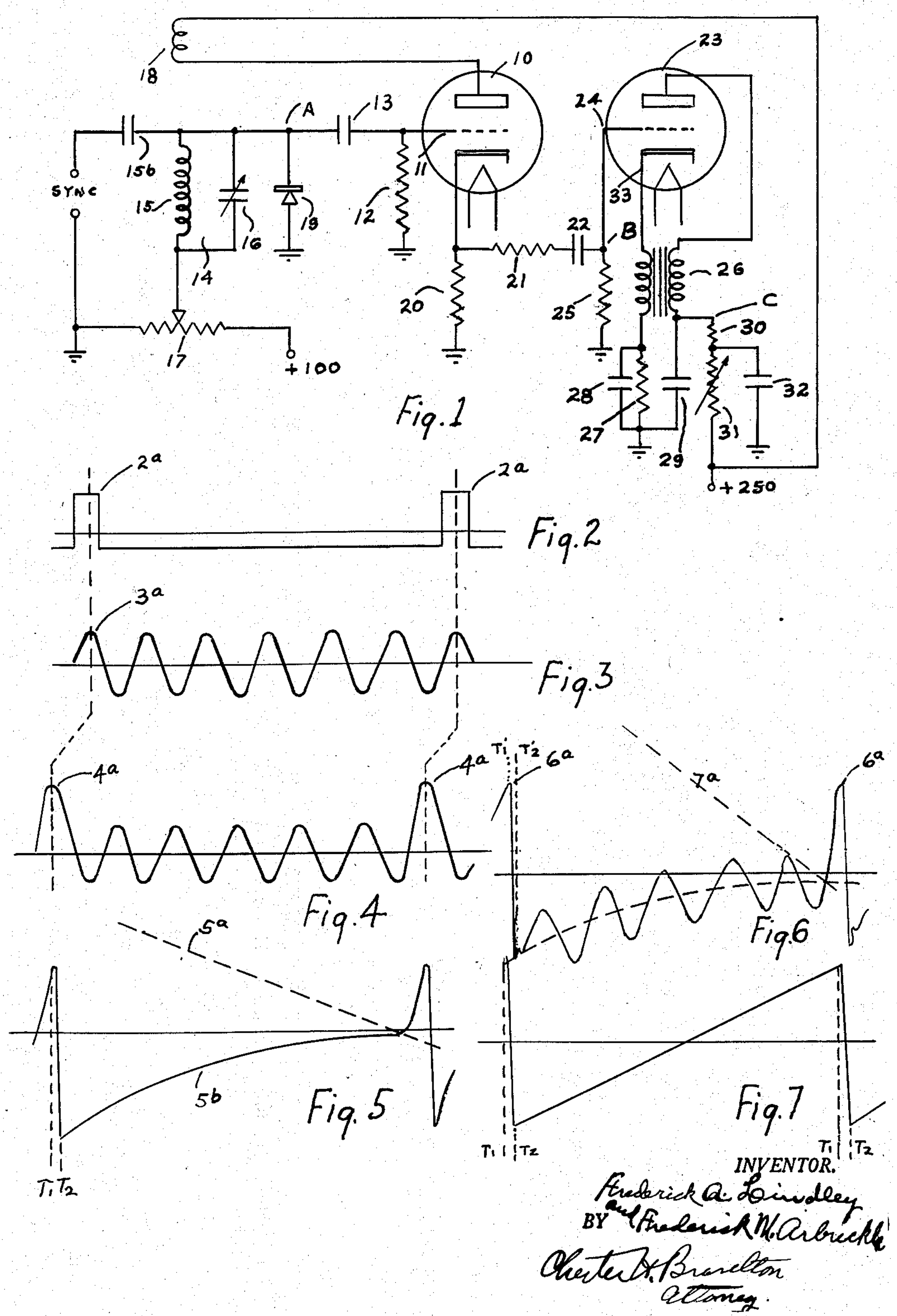
Fig. 1 is a diagrammatic representation of a preferred embodiment of our invention.
Figs. 2, 3, 4, 5, 6 and 7 are illustrations of electrical wave forms found in various parts of the circuit and which are peculiar to the unique operation of the embodiment shown in Fig. 1.

The embodiment of the invention shown in Fig. 1 comprises a vacuum tube 10, connected as an oscillator, having a cathode type output arrangement. Its control grid 11 is supplied with a grid leak resistor 12, and grid coupling condenser 13, which in turn is connected to the oscillator tank circuit 14, comprising inductance 15, and variable condenser 16, said tank circuit being further maintained at some positive potential with respect to ground by merit of its lower end being connected to the adjustable tap on the potentiometer 17, which acts as a bleeder across the plate power supply. The plate circuit of vacuum tube 10 includes a feed back coil 18 which is inductively coupled to the tank circuit 14 and connected in such inductive polarity as to cause self-oscillation of the vacuum tube 10 in a conventional self-excited manner. Connected across the grid end of the tank circuit 14 to ground, indicated at A (Fig. 1), is the diode 19, so polarized with respect to the grid end of the tank circuit, to conduct whenever point A (Fig. 1), representing this connection to the tank circuit, goes sufficiently negative with respect to ground. In the cathode circuit of tube 10 is placed cathode load output resistor 20, which is in turn connected at its cathode end to isolating resistor and condenser 21 and 22, respectively, and over to the grid 24 of vacuum tube 23, having its control grid 24 returned to ground through grid leak resistor 25. The cathode and plate circuits of vacuum tube 23 include the feed back transformer 26, which is so connected to cause blocking oscillator action in a manner to be later described. In the cathode circuit of the tube 23, in addition to one winding of the feed back transformer 26, may be found the self-biasing resistor 27 and associated by-pass condenser 28 for the vacuum tube 23. In the plate circuit of the vacuum tube 23, in addition to the plate winding of the feed back transformer 26, is connected charging condenser 29 and charging resistor 30, the charging resistor 30 being placed at some positive potential through dropping resistor 31, which is by-passed to ground by condenser 32, and subsequently brought to the B supply voltage.

The operation of this circuit is as follows: Vacuum tube 10, having its plate circuit inductively coupled to the grid circuit with sufficient magnitude and polarity of mutual inductance, will cause vacuum tube 10 to sustain oscillation at a frequency determined by the parameters of the tank circuit 14. It is seen, however, that the tank circuit 14 is returned to the center tap of potentiometer 17, which represents some positive D. C. voltage above ground, thus causing point A, the upper or grid end of the tank circuit 14, to be at some D. C. bias potential above ground, of a magnitude determined by adjustment of the potentiometer 17. The diode 19 is connected so as to conduct only on negative excursions of the A. C. voltage appearing across the tank circuit which exceed in magnitude the D. C. bias, thus differentially damping the tank circuit 14. The diode 19, in cooperation with the positive polarity derived from the potentiameter 17, is then seen to act as a limiter or amplitude control for the self-excited oscillator. In operation of this embodiment, the limiter, comprising diode 19 and potentiometer 17, is so adjusted as to prevent the grid 11 of vacuum tube 10 from being excited to the point of grid current, and thus insuring that the impedance across the tank circuit 14, for positive excursions of voltage across the same, is of a relatively high value, and consequently not lowering the operating "Q" of the tank circuit 14 to any marked extent.

This self-excited oscillator, as such, operates as a separate unit and supplies the other section of this embodiment, comprising the circuits immediately associated with and including vacuum tube 23, with a sine wave of voltage as developed across the cathode load resistor 20 of the oscillator vacuum tube 10. Thus, in the operation of the circuit there will be developed across the cathode resistor 20 a voltage wave such as 3*a* shown in Fig. 3. The frequency of this wave will, of course, be that of the self-excited oscillator employing tube 10, and will be adjusted to a value dependent upon the repetition rate of the synchronizing pulse to be received. In the case of present day television standards the repetition rate of the horizontal synchronizing pulse is at a frequency of 15,750 cycles per second, such a synchronizing pulse being represented as 2*a* in Fig. 2. A frequency analysis of the synchronizing pulse as shown in Fig. 2 would reveal that it had important harmonic contents up to the seventh or eighth harmonic, so that should the tank circuit 14 of the oscillator 10 be tuned to some harmonic of the repetition rate of the synchronizing pulse, the synchronizing pulse, if properly applied, could effectively synchronize the oscillator operating at this harmonic frequency.

The second section of the embodiment comprising the vacuum tube 23 and its associated circuit elements, is connected as a blocking oscillator type of sawtooth generator, and may be considered as such and completely separate from the vacuum tube 10 and its associated oscillator circuit. In the operation of the sawtooth blocking oscillator the charging condenser 29, from which is supplied the plate voltage for the tube 23, charges to a point allowing the vacuum tube 23 to conduct. This conduction current, which tends to then discharge the condenser 29 in passing through the plate winding of the blocking oscillator transformer 26, induces a voltage in the cathode winding of the transformer 26 in such direction as to cause the cathode 33 of vacuum tube 23 to swing negatively with respect to ground. This negative excursion of the cathode 33, with respect to ground, causes the grid 24 of the vacuum tube 23, which is connected to ground through the grid return resistor 25, to go positive with respect to the cathode 33, and consequently draws grid current through the grid return resistor 25. As the grid 24 goes positive with respect to the cathode, and draws grid current, the plate current of the tube naturally increases, and further discharges the condenser 29, which causes the cathode to go more negative with respect to ground, and consequently the grid more positive with respect to the cathode. This cumulative action causes the grid to draw such current through resistor 25 to charge condenser 22 to highly negative value.

Fig. 5 represents the wave form of the voltage appearing across the grid 24 to ground of the vacuum tube 23, or at point B (Fig. 1), as it would appear with the sine wave oscillator section of the embodiment non-operative. T-1 to T-2 shows the negative excursion of the grid circuit with respect to ground. The turns ratio of the transformer 26, the value of the resistor 25, and the storage condenser 22, are so selected as to drive the grid 24 to plate current cut-off of the tube 23. The charge on condenser 22, which sustains negative bias on the tube 23, slowly leaks off through resistor 25 at a rate dependent upon the time constant of condenser 22 and resistor 25. It may be noted that at the time the grid is driven positive, with respect to the cathode, and subsequently left negative at plate cut-off, the plate voltage on the tube will be at its minimum, the heavy conduction of the tube 23 having just discharged condenser 29. Now the charging of condenser 29 through resistor 30 may be represented by Fig. 7, the time constant of resistor 30 and condenser 29 being so selected as to produce a relatively linear increase of voltage across this condenser during the cut-off period of the grid. While this condenser resistor combination is charging, the grid leak condenser 22 in the vacuum 23 is slowly discharging, as previously described, through resistor 25, and as it discharges, becomes more and more positive, or less and less negative with respect to ground, and consequently to the cathode of the tube 23. For any given plate voltage on a vacuum tube biased negatively to plate current cut-off there is obviously a definite magnitude of potential which may be applied to the grid, above, which plate current will flow. This critical grid conducting potential, in the case of a triode, is almost inversely proportional to the voltage applied to the plate of the tube. Since this plate voltage in the case of tube 23 is increasing substantially linearily, due to the charging of condenser 29, we may then represent the critical grid potential by a dashed line, such as 5*a* in Fig. 5. As the critical grid conducting potential of the vacuum tube 23, represented by the dashed line 5*a* of Fig. 5 meets the actual grid potential represented by the discharge curve 5*b*, previously described, the plate current begins to flow in the vacuum tube 23, and again the cumulative effect of blocking oscillator action causes the tube to conduct heavily in a very short period of time, discharge condenser 29, and effect a sharp retrace of voltage, shown in Fig. 7. In this blocking oscillator the useful sawtooth of voltage for further application to deflection circuits is taken from point C to ground, which is of the wave form shown in Fig. 7, point C being at the charging condenser 29. It may be noted in this preferred embodiment, that the blocking oscillator feedback is accomplished in the cathode circuit rather than the grid circuit, and consequently the larger grid voltage excursions attendant with the latter feedback are avoided. Advantages of this arrangement will be brought out later in connection with the combined operation of the two sections of the circuit.

Up to this point we have established two separate operating sections of the circuit, a sine wave oscillator associated with vacuum tube 10, operating at a harmonic of the synchronizing pulse repetition rate and which may be synchronized by said pulse, and a blocking oscillator type circuit associated with vacuum tube 23, the blocking oscillator circuit being so connected and operated to produce a saw tooth of voltage useful in scanning television cathode ray tubes.

The sine wave oscillator employing tube 10 was seen to develop its output voltage across resistor 20, connected in its cathode circuit. This voltage is now superimposed on the grid circuit of vacuum tube 23 through the isolating resistor 21 and condenser 22. The blocking oscillator 23 thus has a synchronizing voltage applied and may then be adjusted to operate in cooperation with the vacuum tube 10 as a countdown blocking oscillator, the blocking oscillator section itself having a free running base frequency, dependent upon or controlled by the time constant of resistance 25 and condenser 22. Present day R. M. A. television standards require that the sawtooth of voltage developed across the condenser 29, which is to be used for horizontal sweeping purposes, should be at a rate of 15,750 times per second. Correspondingly, the received synchronizing pulse illustrated in Fig. 2 occurs 15,750 times per second so as to properly synchronize the action of the multivibrator. It is recognized, however, that we may use any harmonic of this synchronizing pulse to properly synchronize the oscillator associated with vacuum tube 10. Arbitrarily in this embodiment we have chosen the sixth harmonic of the received synchronizing pulse repetition rate to synchronize the oscillator which will thus be operating at 9.5 kc. This demands that we effect a six to one ratio for the countdown of the blocking oscillator circuit 23 from the oscillator of vacuum tube 10 so that the blocking oscillator will operate at one-sixth the oscillator frequency of 94.5 kc., or its required 15,750 cycles per second. The superimposition of the sine wave shown in Fig. 3, developed across the cathode resistor 25 of the oscillator 10, which is also part of the grid circuit of the tube 23, upon the grid voltage excursion of vacuum tube 23, represented by Fig. 5, is shown in Fig. 6. This composite wave form, shown in Fig. 6, illustrates the necessity of the superimposed sine wave voltage being of proper amplitude with respect to the grid excursion amplitude for proper countdown operation.

The received synchronizing pulse, after having been demodulated from the carrier, and in the form shown in Fig. 2, is suitably amplified and applied to the tank circuit 14 of the sine wave oscillator through coupling condenser 15*b*, associated with vacuum tube 10. This syncronizing pulse, shown in Fig. 2, will then add to the sine wave shown in Fig. 3, and the result will be an accentuation of every sixth cycle as shown in Fig. 4, the sixth harmonic of the synchronizing pulse repetition rate, of course, acting to synchronize the sine wave oscillator associated with vacuum tube 10, and thus insure the time relationship between the waves shown in Figs. 2 and 3, and their sum in Fig. 4. Any noise or interference occurring on the synchronizing pulse will be attenuated by the high "Q" of tuned circuit 14 employed as the tank of the oscillator circuit which is resonated at 94.5 kc., its effective "Q" being enhanced by the negative resistance introduced into same by merit of its application as an oscillator tank. It will be remembered that the diode 19 is so connected across the tuned circuit 14 to conduct only when point A swings sufficiently negative, while on positive excursions of point A, the diode does not conduct and therefore allows the tank circuit 14 to present its maximum "Q" to positively poled signals. In accord with this, the synchronizing pulses are applied to the tank circuit in a positive poled direction. Due to the fact that the grid of vacuum tube 10 is never driven positive with respect to its cathode, which is in turn due to the limiting action of the oscillator amplitude control diode 19 biased by the potentiometer 17, any positive excursions of amplitude greater than the limited oscillator level will be passed by the vacuum tube 10 and appear across the cathode load circuit, as shown in Fig. 4. Naturally, any interference voltage supplied to the tank circuit in a negative direction will appear highly attenuated across the tank circuit of vacuum 10, since the diode 19 acts to conduct in that direction and thus reduce the impedance across the tuned circuit.

Considering now the action of the synchronized oscillator associated with vacuum tube 10, and the blocking oscillator associated with vacuum tube 23, the resulting wave form shown in Fig. 6 will be apparent on the grid 24 of the vacuum tube 23. Should the synchronizing pulse be imposed across the tuned circuit in a positive direction so as to lift or raise the amplitude of one cycle of the 94.5 kc. wave train normally emanating from the cathode circuit of the vacuum tube 10, such lifting action being shown at 4*a* in Fig. 4 as it appears across the cathode circuit, and as 6*a* in Fig. 6 as it subsequently appears on the grid 24 of the blocking oscillator 23, the raised cycle 4*a* or 6*a* of the 94.5 kc. wave train will reach an amplitude sufficiently high to cause the grid 24 of the multivibrator tube 23 to reach its critical grid conducting potential and cause the discharge of the condenser 29 to effect the retrace portion of the sawtooth sweep as shown as T-1 to T-2 in Fig. 6. This gives the proper phasing of the sawtooth as well as synchronization with the sync. pulse. Thus the requirements in a television system that the return trace of the sweep sawtooth voltage occur simultaneously with the arrival of the synchronizing pulse, is met by this system. Failure for a synchronizing pulse to be received will still allow the blocking oscillator to generate a sawtooth voltage for the sweep deflection circuits at a frequency dependent upon the free running frequency of the sine wave oscillator associated with vacuum tube 10, this, in effect, giving the blocking oscillator the equivalent better stability of the sine wave oscillator. With proper adjustment the unsynchronized 94.5 kc. oscillator will shift frequency only slightly and be displaced in time very little during the synchronizing pulse absence, due to its inherent stability, the six to one count-down ratio between the blocking oscillator and sine wave oscillator being maintained at all times regardless of synchronizing pulse presence. Thus the addition of the synchronizing pulse to the wave train generated by the oscillator of such amplitude to cause the blocking oscillator circuit to fire and create the retrace of the sawtooth sweeping voltage, effectively acts as a horizontal framing pulse and provides means for the blocking oscillator to be not only forced into synchronism by and with the arrived synchronizing waves, but to be in asynchronization therewith, and thereby properly framing the received picture horizontally.

From the foregoing description of the operation of the device it will be seen that this method of sweep synchronization allows for a continuous source of sawtooth sweep voltage for supplying the cathode ray tube deflection system at 15,750 cycles per second, even without the arrival of a synchronizing pulse. The accuracy of its maintaining a frequency close to 15,750 is dependent upon the stability of the sine wave oscillator and its ability to synchronize with harmonics of the television line frequency. Thus the sine wave oscillator stability is substituted for the much lesser stability of a blocking oscillator running free at 15,750 cycles per second. When the synchronizing pulse does arrive it not only synchronizes the sine wave oscillator, but it also frames the picture through its asynchronizing action on the blocking oscillator. Variations in amplitude of the synchronizing pulse, once the blocking oscillator has been properly asynchronized, or the picture properly framed, are of relatively little importance, since the required voltage to synchronize a sine wave oscillator may be well one five-hundredth of that necessary to asynchronize the multivibrator or frame the picture. Correspondingly, a small amplitude 94.5 kc. component may be derived from the picture signal through a suitable filter and used to synchronize the 94.5 kc. oscillator, whereas the asynchronism or framing must, of necessity, be accomplished by the arrival of a synchronizing pulse. In such an arrangement the deflection system would operate exactly without sync. pulse reception once the asynchronism and framing had been accomplished, either manually or by the action of at least one synchronizing pulse at the beginning of the reception period, continuous synchronizing pulse reception not being necessary in the application of this system.

Other advantageous applications of the methods and forms of the invention described herein will automatically suggest themselves to those skilled in the art, to which this invention relates, without, however, departing from the following claims.

What we claim is:

1. In an electrical synchronizing system a source of synchronizing pulses of predetermined wave-form characteristics, a first self-sustaining electronic oscillator producing a periodically recurrent actuating wave-form, a second self-sustaining electronic oscillator, means connected between said synchronizing pulse source and said first electronic oscillator for synchronizing the first electronic oscillator by the synchronizing pulses, and means including said synchronizing pulse source and said first oscillator for synchronizing said second electronic oscillator by the actuating wave-form produced by said first electronic oscillator concurrently with the synchronization of said second electronic oscillator from energy defined by the contour of the synchronizing pulses wave-form.

2. In an electrical synchronizing system a source of synchronizing pulses of predetermined wave-form, a first self-sustaining electronic oscillator capable of being synchronized through the application of the synchronizing pulses, said first oscillator inherently producing a periodically recurrent actuating wave-form, a second self-sustaining electronic oscillator being more difficult of synchronization than said first electronic oscillator, means for synchronizing said first electronic oscillator by the synchronizing pulses, and means connected between said synchronizing pulse source and said first electronic oscillator for synchronizing said second electronic oscillator by the actuating wave-form produced by said first oscillator concurrently with additional synchronization of said second electronic generator by partial application thereto of energy defined by the wave-form contour of the synchronizing pulses.

3. In an electrical synchronizing system, a source of periodically recurrent synchronizing pulses of predetermined wave-form, a sine wave oscillator, a secondary electric wave generator, means connected between said synchronizing pulse source and said sine wave oscillator for synchronizing the sine wave oscillator by the synchronizing pulses, and means for synchronizing the secondary wave generator by the output of the sine wave oscillator concurrently with synchronization of the secondary generator from periodically recurrent quanta of energy defined by characteristics of the synchronizing pulses' wave-form.

4. In an electrical synchronizing system, a source of synchronizing pulses, a sine wave oscillator, a secondary electrical wave generator, means controlling the secondary electrical wave generator from the output of the sine wave oscillator, means synchronizing the sine wave oscillator by the synchronizing pulses, and means causing the synchronizing pulses applied to the sine wave oscillator to appear in the output of the sine wave oscillator so as to aid in the synchronization of the secondary electric wave generator by the sine wave oscillator.

5. In an electrical synchronizing system, a source of synchronizing pulses having considerable harmonic content, a sine wave oscillator and a secondary electrical wave generating means coupled between said source of synchronizing pulses and said sine wave oscillator, means for maintaining synchronized operation of the sine wave oscillator at a harmonic of the repetition rate of the synchronizing signal, means connected between the output of said sine wave oscillator and said secondary wave generator for controlling the secondary wave generator by a signal derived from the output of the sine wave oscillator, said secondary generator being connected for operation at a sub-harmonic of the sine-wave oscillator, and means to cause the synchronizing signal applied to said sine wave oscillator to effectively appear in the output of the sine wave oscillator in such a way as to aid the signal derived from said sine wave oscillator in controlling operation of the secondary wave generating means.

6. In an electrical synchronizing system, in combination, a source of periodically recurrent synchronizing pulses; a first electronic oscillator adapted to inherently produce a free-running output signal frequency bearing an approximate harmonic relationship with the recurrence frequency of said synchronizing pulses; a second electronic oscillator adapted to inherently produce a free-running output signal frequency approximately integrally related to the recurrence frequency of said synchronizing pulses; means applying said synchronizing pulses to said first electronic oscillator for synchronism thereof at an exact harmonic of the synchronizing pulse recurrence frequency; means applying the output of said first oscillator to said second oscillator for synchronism thereof at a frequency exactly integrally related to the synchronizing pulse recurrence frequency; and means applying an electrical version of said synchronizing pulses to said second oscillator to establish a predetermined phase relationship between predetermined aspects of the output signal developed by said second oscillator and the timing of said synchronizing pulses.

7. In an electrical synchronizing system, in combination, a source of periodically recurrent synchronizing pulses; a sine wave oscillator adapted to inherently produce a free-running output signal frequency bearing an approximate harmonic relationship with the recurrence frequency of said synchronizing pulses; a second electronic oscillator adapted to inherently produce a free-running output signal frequency approximately integrally related to the recurrence frequency of said synchronizing pulses; means applying said synchronizing pulses to said sine wave oscillator for synchronism thereof at an exact harmonic of the synchronizing pulse recurrence frequency; means applying the output of said sine wave oscillator to said second oscillator for synchronism thereof at a frequency exactly integrally related to the synchronizing pulse recurrence frequency; and means applying an electrical version of said synchronizing pulses to said second oscillator to establish a predetermined phase relationship between certain aspects of the output signal developed by said second oscillator and the timing of said synchronizing pulse.

8. In an electrical synchronizing system, a source of periodically recurrent synchronizing pulses; a first electronic oscillator adapted to have an inherent free-running frequency of oscillation at an approximate harmonic of the recurrence frequency of said synchronizing pulses; a second electronic oscillator adapted to inherently produce a free-running output signal frequency bearing an approximate sub-harmonic relationship to the free-running frequency of said electronic oscillator; means applying said synchronizing pulses to said first oscillator for synchronism thereof at an exact harmonic of the synchronizing pulses recurrence frequency; means connected with said first oscillator for permitting a portion of the applied synchronizing pulse to be represented in the output of said first oscillator; means applying the output of said first oscillator to said second oscillator for synchronism thereof at a frequency exactly sub-harmonically related to the electronic oscillator synchronized operating frequency, the amplitude of said synchronizing pulse appearing in the output of said first oscillator being such to exercise a timing influence on said second oscillator sufficiently predominating over the synchronizing influence of the oscillatory signal developed by said first oscillator to establish a predetermined phase relationship between certain aspects of the output signal developed by said second oscillator and the timing of said synchronizing pulses.

9. In an electrical synchronizing system, a source of periodically recurrent synchronizing pulses; an electron tube adapted for sustained oscillation at a frequency approximately harmonically related to the recurrence frequency of said synchronizing pulses; means applying said synchronizing pulses for synchronized control of the oscillating frequency of said first electron tube at a frequency exactly harmonically related to the recurrence frequency of said synchronizing pulses; means controlling the operating conditions of said first electron tube such that that portion of the synchronizing pulses utilized to synchronize the oscillatory action of said first electron tube is represented in the signal developed by said first electron tube such that the output signal developed by said first electron tube contains an oscillatory component and a pulse component; a second electron tube connected for self-sustained oscillation at a frequency substantially sub-harmonically related to the synchronized oscillating frequency of said first electron tube; and means applying the output signal of said first electron tube to said second electron tube such that the oscillatory component output signal of said first electron tube synchronizes the oscillation of said second electron tube to maintain an exact sub-harmonic relationship thereof with the oscillating frequency of said first electron tube while the pulse component of said first electron tube output signal acts to establish a predetermined phase relationship between predetermined aspects of the output signal developed by said second oscillator and the timing of said synchronizing pulses.

10. In an electrical synchronizing system, a source of synchronizing pulses; a first electron tube having an anode, a control electrode and a cathode; a tuned circuit connected with the control electrode of said first electron tube, the resonant frequency of said tuned circuit being approximately harmonically related to the recurrence frequency of said synchronizing pulses; coupling from the anode-cathode circuit of said electron tube from the control electrode-cathode circuit of said electron tube such that said first electron tube maintains a free-running oscillation at a frequency determined by said resonant circuit; means applying said synchronizing pulses to the control electrode-cathode circuit for synchronizing the oscillation of said electron tube at an operating frequency exactly harmonically related to the recurrence frequency of said synchronizing pulses; means connected with said electron tube to limit the amplitude of oscillation obtained by said electron tube to a value allowing a version of the applied synchronizing pulses to appear in the anode-cathode circuit of said electron tube; and an electrically-responsive means, means coupling the output signal developed in said electron tube anode-cathode circuit to said electrically responsive means such that one aspect of the operation of said electrically responsive means is controlled by the oscillatory component developed by said electron tube while another operational aspect is controlled by the version of said synchronizing pulses appearing in the anode-cathode circuit of said electron tube.

11. Apparatus according to claim 10 wherein said means for limiting the amplitude of oscillation by said electron tube comprises a series connection of a unilateral conductance device and a source of unidirectional potential, said series connection being placed in shunt with a portion of said resonant circuit.

12. Apparatus according to claim 10 wherein said electrically responsive means comprises an electronic oscillator having an inherent free-running frequency of oscillation approximately sub-harmonically related to the recurrence frequency of said synchronizing pulses, and wherein said means applying the electrical signal developed in the anode-cathode circuit of said electron tube to said electronic oscillator establishes synchronization of said electronic oscillator at an exact sub-harmonic of the oscillatory signal appearing in said electron tube anode-cathode circuit while the synchronizing pulse repetition appearing in said anode-cathode circuit acts to establish a predetermined phase relationship between certain aspects of the output signal developed by said electronic oscillator and the timing of said synchronizing pulses.

13. In an electrical synchronizing system, a source of synchronizing pulses; a first electronic discharge tube having an anode, a control electrode and a cathode; a point of reference potential; a tuned circuit coupled with said control electrode, the resonant frequency of said tuned circuit being approximately a harmonic of the recurrence frequency of said synchronizing pulses; means establishing said tuned circuit at a positive potential with respect to said point of reference potential; a unilateral device connected from the control electrode side of said tuned circuit and said point of reference potential; means for coupling energy derived from the electron tube anode-cathode circuit to the electron tube control electrode-cathode circuit for sustained oscillation of the electron tube at the resonant frequency of said tuned circuit; means for applying said synchronizing pulses to said tuned circuit for synchronization of said electron tube oscillations at an exact harmonic of the recurrence frequency of said synchronizing pulses; and means for adjusting the potential of said resonant circuit relative to said point of reference potential such that the amplitude of the oscillations produced by said electron tube appearing on the control electrode of said electron tube are insufficient to drive said control electrode positively with respect to said cathode such to permit passage of synchronizing pulse components by said electron tube whereby there appears in the anode-cathode circuit of said electron tube a combination signal comprising a synchronized oscillatory component and a harmonically related pulse component.

14. In an electrical synchronizing system, a source of synchronizing pulses; a first electronic discharge tube having an anode, a control electrode and a cathode; a point of reference potential; a tuned circuit coupled with said control electrode, the resonant frequency of said tuned circuit being approximately harmonic of the recurrence frequency of said synchronizing pulses; means establishing said tuned circuit at a positive potential with respect to said point of reference potential; a unilateral device connected from the control electrode side of said tuned circuit and said point of reference potential; means for coupling energy derived from the electron tube anode-cathode circuit to the electron tube control electrode-cathode circuit for sustained oscillation of the electron tube at the resonant frequency of said tuned circuit; means applying said synchronizing pulses to said tuned circuit for synchronization of said electron tube oscillations at an exact harmonic of the recurrence frequency of said synchronizing pulses; means adjusting the potential of said resonant circuit relative to said point of reference potential such that the amplitude of the oscillations produced by said electron tube appearing on the control electrode of said vacuum tube are insufficient to drive said control electrode positively with respect to said cathode such that there appears in the anode-cathode circuit of said electron tube a combination signal comprising a synchronized oscillatory component and a harmonically related pulse component; an electric wave-responsive device; and means coupling the combination signal appearing in said electron tube anode-cathode circuit to the input of said electric wave-responsive device, to control one operational aspect of said wave-responsive device by the oscillatory component of the combination signal while another operational aspect of said wave-responsive device is controlled by the pulse component of the combination signal.

FREDERICK A. LINDLEY.
FREDERICK M. ARBUCKLE.

REFERENCES CITED

The following references are of record in the file of this patent:

UNITED STATES PATENTS

| Number | Name | Date |
|---|---|---|
| 2,250,284 | Wendt | July 22, 1941 |
| 2,277,000 | Bingley | Mar. 17, 1942 |
| 2,389,025 | Campbell | Nov. 13, 1945 |
| 2,445,933 | Beste | July 27, 1948 |